US012755275B2

(12) United States Patent
Hafez

(10) Patent No.: US 12,755,275 B2
(45) Date of Patent: Oct. 6, 2026

(54) SYSTEM AND METHOD FOR SECURE TRANSACTIONS

(71) Applicant: DATA MESH GROUP PTY LTD, Barangaroo (AU)

(72) Inventor: Tareq Hafez, New South Wales (AU)

(73) Assignee: DATA MESH GROUP PTY LTD, Barangaroo (AU)

(*) Notice: Subject to any disclaimer, the term of this patent is extended or adjusted under 35 U.S.C. 154(b) by 181 days.

(21) Appl. No.: 18/281,895

(22) PCT Filed: Apr. 6, 2022

(86) PCT No.: PCT/AU2022/050306
§ 371 (c)(1),
(2) Date: Sep. 13, 2023

(87) PCT Pub. No.: WO2022/213150
PCT Pub. Date: Oct. 13, 2022

(65) Prior Publication Data

US 2024/0152914 A1 May 9, 2024

(30) Foreign Application Priority Data

Apr. 9, 2021 (AU) ................................ 2021901044

(51) Int. Cl.
*G06Q 20/38* (2012.01)
*G06Q 20/32* (2012.01)
(Continued)

(52) U.S. Cl.
CPC ....... *G06Q 20/382* (2013.01); *G06Q 20/3276* (2013.01); *G06Q 20/34* (2013.01); *G06Q 20/4012* (2013.01); *G06Q 20/4097* (2013.01)

(58) Field of Classification Search
None
See application file for complete search history.

(56) References Cited

U.S. PATENT DOCUMENTS

| | | | | |
|---|---|---|---|---|
| 11,599,873 B2 * | 3/2023 | Campos | G06Q 20/36 | |
| 2009/0204530 A1 * | 8/2009 | Hanson | G06Q 20/14 | 713/176 |

(Continued)

FOREIGN PATENT DOCUMENTS

| | | |
|---|---|---|
| EP | 3 588 414 A1 | 1/2020 |
| WO | WO 2015/055972 A1 | 4/2015 |
| WO | WO 2020/174296 A1 | 9/2020 |

OTHER PUBLICATIONS

International Search Report mailed Jun. 14, 2022, in PCT International Application PCT/AU2022/050306, 10 pages.

*Primary Examiner* — Chrystina E Zelaskiewicz
(74) *Attorney, Agent, or Firm* — FINNEGAN, HENDERSON, FARABOW, GARRETT & DUNNER LLP

(57) ABSTRACT

Described herein is are systems and methods for conducting secure transactions. In one embodiment, a method (300) is provided of conducting a secure transaction between a merchant and a customer. Method (300) includes initiating a transaction between the customer and the merchant by capturing a primary account number of the customer and a transaction amount at a merchant terminal (104). A transaction identifier is generated that is unique to the transaction based on the primary account number and transaction amount. The transaction identifier is then encoded in a visual representation and presented on a display so that it can be captured by a camera on a customer device. In response, a customer app is launched on a customer device (106). The customer app is configured to: control the customer device (106) to present the customer with a user interface to enter a PIN number associated with the primary account number of the customer; and generate a PIN block for the PIN number and transmit the PIN block to a transaction server (102) for verification. A verification or rejection of the (Continued)

transaction is then generated from a financial institution associated with the customer account. Finally, the verification or rejection of the transaction is transmitted to the merchant terminal (104) to complete the transaction.

31 Claims, 6 Drawing Sheets

(51) Int. Cl.
*G06Q 20/34* (2012.01)
*G06Q 20/40* (2012.01)

(56) References Cited

U.S. PATENT DOCUMENTS

| | | | | |
|---|---|---|---|---|
| 2012/0072714 | A1* | 3/2012 | Grandcolas | H04L 63/0853 713/155 |
| 2012/0304310 | A1 | 11/2012 | Blaisdell | |
| 2015/0178724 | A1 | 6/2015 | Ngo et al. | |
| 2016/0027006 | A1 | 1/2016 | Billett, Jr. | |
| 2018/0047010 | A1* | 2/2018 | Itwaru | G06Q 20/322 |
| 2018/0137272 | A1 | 5/2018 | Kamal | |
| 2018/0300698 | A1 | 10/2018 | Block et al. | |
| 2020/0092272 | A1* | 3/2020 | Eisen | H04L 63/0869 |
| 2020/0265135 | A1 | 8/2020 | Michie et al. | |
| 2025/0238781 | A1* | 7/2025 | Bodalia | G06Q 20/405 |

* cited by examiner

SYSTEM AND METHOD FOR SECURE TRANSACTIONS

CROSS-REFERENCE TO RELATED APPLICATIONS

This application is a U.S. National Phase of International Application No. PCT/AU2022/050306, filed Apr. 6, 2022, which claims priority to Australian Patent Application No. 2021901044, filed Apr. 9, 2021.

FIELD OF THE INVENTION

The present application relates to payment systems and in particular to a system, method and software application for conducting a secure transaction between a merchant and a customer.

Embodiments of the present invention are particularly adapted for conducting a transaction wherein the device for reading a customer card is separate to the device for entering a PIN. Preferably, the PIN entry device is a customer owned device such as a smartphone or tablet computer. However, it will be appreciated that the invention is applicable in broader contexts and other applications.

BACKGROUND

The types of devices that accept credit/debit cards are expanding beyond the traditional multi-processor secure EFTPOS devices that are specifically designed for processing such cards. A Payment Card Industry (PCI) standard called PCI-CPoC currently exists to support Commercial Off-The-Shelf (COTS) devices such as smartphones and tablets in reading credit/debit EMV contactless cards. Another PCI standard called PCI-SPoC also exists that support COTS devices accepting Personal Identification Number (PIN) entry when connected to an approved Secure Card Reader for PIN (SCRP) device. However, there is no current approved standard for both card reads and PIN entry using COTS devices only.

Global payment standards do not currently allow a PIN to be entered on the same COTS device as the card reader due to the security risk of combining the processing of both card data (including card number and expiry) and the PIN on the same device. The risk relates to the ability of someone to hack that processor's memory capturing both the card data and its associated PIN. This risk is far greater than just capturing the card number. To meet this standard, a secure EFTPOS device has 2 processors; one for general processing and another for sensitive secure functions such as capturing the PIN securely in isolation of the main processor then transforming it into an encrypted PIN BLOCK prior to passing it to the main processor. Furthermore, by requiring the customer to enter on their PIN on a merchant PCI-CPoC approved device, the customer may be reluctant to enter their PIN at an unfamiliar device.

Any discussion of the background art throughout the specification should in no way be considered as an admission that such art is widely known or forms part of common general knowledge in the field.

SUMMARY OF THE INVENTION

In accordance with a first aspect of the present invention, there is provided a method of conducting a secure transaction between a merchant and a customer, the method including:

- initiating a first secure monitored session between a merchant terminal and a transaction server;
- during the first secure monitored session, capturing a customer primary account number (PAN) at the merchant terminal, the customer PAN being associated with a customer account at a financial institution;
- sending a request for a transaction from the merchant terminal to the transaction server, the request including the customer PAN and a transaction amount;
- generating, at the transaction server, a transaction identifier (TRANS-ID) that is unique to the transaction, and sending TRANS-ID to the merchant terminal;
- encoding TRANS-ID in a visual representation and presenting the visual representation on a display;
- allowing capture of the visual representation by a camera on a customer device;
- in response to the capture of the visual representation, launching a customer app on the customer device, wherein the customer app is configured to:
  - initiate a second secure monitored session between the customer device and the transaction server;
  - control the customer device to present the customer with a user interface to enter a PIN number associated with the customer PAN;
  - generate a PIN block for the PIN number using a random primary account number downloaded from the server and transmit the PIN block to the transaction server for verification;
- obtaining, at the transaction server, a verification or rejection of the transaction from the financial institution associated with the customer account; and
- transmitting the verification or rejection of the transaction to the merchant terminal to complete the transaction.

In some embodiments, the merchant terminal is authorized to communicate with the transaction server via a merchant app that is stored on the merchant terminal using a first statistically unique random number (MA-RAND1) as a temporary merchant identifier. A temporary merchant identifier is a temporary identification number that uniquely identifies the merchant for the transaction. The temporary merchant identifier is not a conventional Merchant ID that is fixed and registered to a particular merchant for all transactions.

In some embodiments, the step of initiating the first secure monitored session includes:

i) creating, at the merchant app, a second statistically unique random number (MA-RAND2);
ii) generating a session key (MA-SESSION-KEY) using MA-RAND2 and a unique seed value for the merchant app version as key parameters;
iii) calculating a key check value (KCV) of MA-SESSION-KEY;
iv) sending MA-RAND1 XOR MA-RAND2 and KCV from the merchant app to the transaction server, where XOR represents a bitwise exclusive OR function;
v) calculating MA-SESSION-KEY at the transaction server and verifying the KCV against the KCV received from the merchant app;
vi) sending white box cryptography tables from the transaction server to the merchant app, wherein the white box cryptography tables are encrypted using MA-SESSION-KEY;
vii) decrypting, at the merchant app, the white box cryptography tables using MA-SESSION-KEY and replacing the current white box cryptography tables with the new decrypted tables;
viii) replacing MA-RAND1 with MA-RAND2; and ix) repeating steps vi) to viii) at predefined time intervals during the first secure monitored session.

In some embodiments, the MA-SESSION-KEY is generated by applying a one way function to both MA-RAND2 and the unique seed value.

In some embodiments, if KCV calculated at the transaction server mismatches the KCV received from the merchant app, the transaction server replaces MA-RAND1 with an alternate statistically unique random number (MA-RAND1-BAK). Preferably, if the KCV calculated at the transaction server mismatches with the KCV received from the merchant app, then an error condition is raised. After a predefined number of error conditions, the merchant app may request that the server generate an alternative first statistically random number MA-RAND1.

In some embodiments, the white box cryptography tables include an embedded single use key. In some embodiments, the single use key is an AES-256 Symmetric single use key.

In some embodiments, the white box cryptography tables are replaced at time intervals in the range of 1 to 5 seconds. In some embodiments, the white box cryptography tables are replaced at time intervals of every 2 seconds.

In some embodiments, during the first secure monitored session, the merchant app executes a check routine to check for signs of tampering by examining the integrity of the operating system, memory and/or stored code and files of the merchant terminal.

Preferably, the merchant app executes within a Trusted Execution Environment of the merchant terminal.

In some embodiments, during the first secure monitored session, the merchant app reports data from the check routine at least once per second to the transaction server and the transaction server compares the reported data to expected results of the merchant app and the device type it is executing on.

In some embodiments, the visual representation includes a QR code. In other embodiments, the visual representation includes a barcode.

In some embodiments, the merchant terminal is a personal mobile device. The personal mobile device may be a smartphone or tablet computer.

In some embodiments, the step of initiating a second secure monitored session between the customer device and the transaction server includes:

a) creating a statistically unique random number (CA-RAND) at the customer app;
b) generating a session key (CA-SESSION-KEY) using CA-RAND and a second unique seed value for the customer app version as key parameters;
c) calculating a second key check value (KCV2) of CA-SESSION-KEY at the customer app and sending KCV2 and a hash of a function result combining TRANS-ID and TIMESTAMP1 XOR CA-RAND to the transaction server;
d) calculating the CA-SESSION-KEY at the transaction server and verifying KCV2 against the KCV2 obtained from the customer app;
e) sending white box cryptography tables, a second transaction timestamp (TIMESTAMP2) and a random PAN from the transaction server to the customer app, wherein the white box cryptography tables are encrypted using the CA-SESSION-KEY;
f) replacing TRANS-ID with CA-RAND and TIMESTAMP1 with TIMESTAMP2 at the transaction server;
g) decrypting, at the customer app, the white box cryptography tables using CA-SESSION-KEY and replacing the current white box cryptography tables with the new decrypted tables;
h) replacing TRANS-ID with CA-RAND and TIMESTAMP1 with TIMESTAMP2 at the customer app;
i) repeating steps f) to h) at predetermined time intervals during the second secure monitored session.

In some embodiments, the CA-SESSION-KEY is calculated at the transaction server by applying a one way function to the CA-RAND and the second unique seed value. In some embodiments, the CA-SESSION-KEY is calculated at the transaction server by extracting CA-RAND from a hash of a function result combining TRANS-ID and TIMESTAMP1 XOR CA-RAND.

In some embodiments, if KCV2 calculated at the transaction server mismatches the KCV2 received from the customer app, the transaction server replaces TRANS-ID and TIMESTAMP1 with older backup values.

In some embodiments, the white box cryptography tables are replaced at time intervals in the range of 1 to 5 seconds. In some embodiments, the white box cryptography tables are replaced at time intervals of every 2 seconds. Preferably, the white box cryptography tables are deleted upon ending the first and second secure monitored sessions.

In some embodiments, during the second secure monitored session, the customer app executes a check routine to check for signs of tampering by examining the integrity of the operating system, memory and/or stored code and files of the customer device. Preferably, the customer app executes within a Trusted Execution Environment of the customer device.

In some embodiments, during the second secure monitored session, the customer app reports data from the check routine at least once per second to the transaction server and the transaction server compares the reported data to expected results of the customer app and the device type it is executing on.

In accordance with a second aspect of the present invention, there is provided a method of conducting a secure transaction between a merchant and a customer, the method including:

- initiating a transaction between the customer and the merchant by capturing a primary account number (PAN) of the customer and a transaction amount at a merchant terminal;
- generating a transaction identifier (TRANS-ID) that is unique to the transaction based on the PAN and transaction amount;
- encoding TRANS-ID in a visual representation and presenting the visual representation on a display;
- allowing capture of the visual representation by a camera on a customer device;
- in response to the capture of the visual representation on the customer device, launching a customer app on the customer device, wherein the customer app is configured to:
  - control the customer device to present the customer with a user interface to enter a PIN number associated with the PAN of the customer;
  - generate a PIN block for the PIN number and transmit the PIN block to a transaction server for verification;
- obtaining a verification or rejection of the transaction from the financial institution associated with the customer account; and
- transmitting the verification or rejection of the transaction to the merchant terminal to complete the transaction.

In accordance with a third aspect of the present invention, there is provided a computer system configured to perform a method according to the first or second aspects.

In accordance with a fourth aspect of the present invention, there is provided a non-transient carrier medium having instructions stored thereon such that, when executed on a computer, the computer is configured to perform a method according to the first or second aspects.

In accordance with a fifth aspect of the present invention, there is provided a software application executable on a customer mobile device and configured to facilitate a method of conducting a secure transaction between the customer mobile device and a merchant terminal, the method including:

in response to a request received by the merchant terminal, processing, by a processor of the customer mobile device, a digital image captured by a camera of the customer mobile device, the image including an encoded transaction identifier (TRANS-ID) that is unique to the transaction;

initiating a secure monitored session between the customer mobile device and a transaction server;

controlling a user interface on the customer mobile device to present a customer with an interface to enter a PIN number associated with a customer primary account number (PAN) of the customer;

upon receipt of the PIN number at the interface, generating a PIN block for the PIN number and transmitting the PIN block to the transaction server for verification for obtaining a verification or rejection of the transaction from a financial institution associated with the customer account.

In some embodiments, the software application is further configured to receive a verification or rejection of the transaction at the customer mobile device and display the verification or rejection to the customer on a display of the customer mobile device.

In accordance with a sixth aspect of the present invention, there is provided a server configured to facilitate a method of conducting a secure transaction between a customer mobile device and a merchant terminal, the method including:

conducting a first secure monitored session with the merchant terminal, wherein during the first secure monitored session, a customer primary account number (PAN) is captured at the merchant terminal, the customer PAN being associated with a customer account at a financial institution;

receiving a request for a transaction from the merchant terminal, the request including the customer PAN and a transaction amount;

generating a transaction identifier (TRANS-ID) that is unique to the transaction, and sending TRANS-ID to the merchant terminal, wherein TRANS-ID is encoded in a visual representation and presented on a display for capture by a camera on the customer device;

conducting a second secure monitored session with the customer device, wherein during the second secure monitored session, the customer device is controlled to:

present the customer with a user interface to enter a PIN number associated with the customer PAN; and generate a PIN block for the PIN number using a random primary account number downloaded from the server and transmit the PIN block to the server for verification;

receiving the PIN block and obtaining a verification or rejection of the transaction from a financial institution associated with the customer account; and transmitting the verification or rejection of the transaction to the merchant terminal to complete the transaction.

In accordance with a seventh aspect of the present invention, there is provided a server configured to facilitate a secure transaction between a customer mobile device and a merchant terminal, wherein the merchant terminal is controlled to capture a customer primary account number (PAN) and the customer mobile device is controlled to allow entry of a PIN number associated with the customer PAN to complete the transaction.

In some embodiments, the customer mobile device is authorized for the transaction at a point of sale. In some embodiments, the authorization is provided through the capture of a QR code by a camera of the customer mobile device.

Embodiments of the present invention allow for the device that captures the PIN to be separated from the device that reads the card. Specifically, the invention allows for the PIN entry device to be the customer device. The customer card may be either stored within a mobile phone digital wallet or is a physical card.

Normally, the customer only needs to present a credit/debit card (or equivalent) to an EFTPOS secured device or a CPoC approved device. No PIN entry is normally required unless the payment transaction amount exceeds a transaction floor limit. In the present invention, instead of prompting for a PIN, the merchant terminal displays a QR code (or other visual representation) to transmit a unique transaction ID obtained from a transaction server to the customer device (phone or tablet).

The customer device has a camera capable of scanning the QR code or other visual representation and automatically downloading a small app, such as an instant-app, to the customer device. The small app's primary purpose is to prompt for the customer's PIN securely, then to securely transmit an encrypted PIN BLOCK to the transaction server along with the transaction ID. The unique transaction ID allows the monitoring/processing server to combine the card number with the associated PIN. To operate securely, the small app continuously checks its integrity and the integrity of the underlying operating system of the customer device and continuously or regularly reports to a server that is responsible for monitoring the app and attesting to its security during PIN entry. This includes employing encryption using a statistically unique key, and white box cryptography if access to the secure element or trusted secure environment within the customer device cannot be gained. The server combines the card number from the merchant terminal with the PIN BLOCK from the customer device and processes the payment transaction.

If the app is already downloaded into the customer's device, scanning the QR code will immediately initiate/activate the app. Otherwise a smaller version of the app such as an instant app or app clip may be downloaded and then executed.

Furthermore, COTS devices such as mobile phones and tablets lack the printer that traditional standalone EFTPOS devices have. The merchants may have an external receipt printer to fulfil their obligation of providing the customer with a payment receipt if requested. Alternatively, a digital receipt can be delivered to the customer device via the customer app. Alternatively, or in addition, the merchant device may prompt for a customer email address or a mobile phone number to send a URL link of the receipt.

Even if the transaction does not require a PIN entry, the merchant terminal may still display a QR code or other visual representation that the customer may optionally scan to download the full app and obtain the electronic transaction receipt. The same app can then be used to view past transactions for the customer and the processing server is able to provide customer with loyalty rewards. The customer can also be notified through the app of future transactions using the same credit/debit card.

BRIEF DESCRIPTION OF THE FIGURES

Example embodiments of the disclosure will now be described, by way of example only, with reference to the accompanying drawings in which.

DESCRIPTION OF THE INVENTION

System Overview

Figure 1:
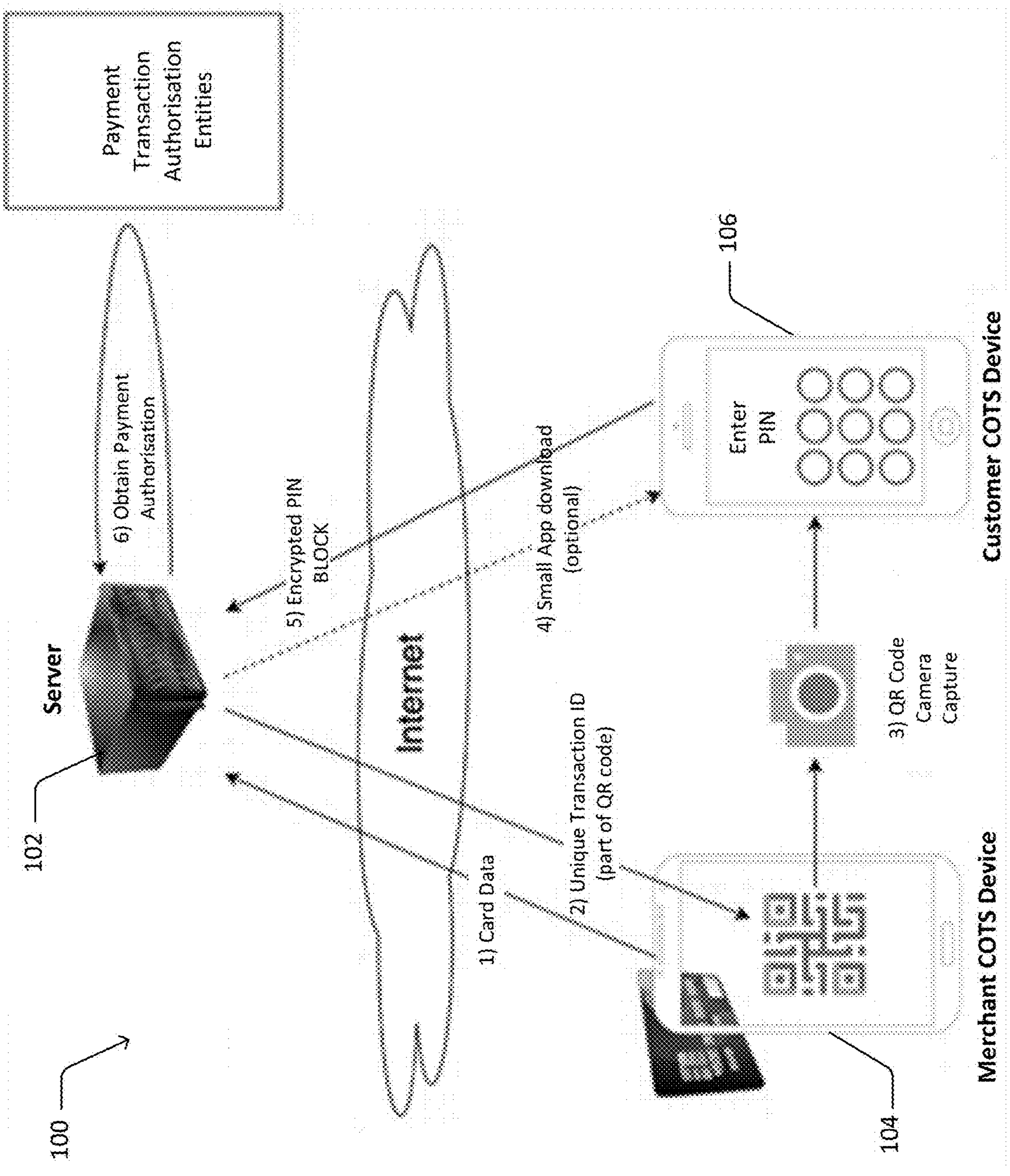
FIG. 1 is a schematic diagram of a system for conducting a secure transaction, illustrating steps in a transaction process.

Referring initially to FIG. 1, there is illustrated schematically a system 100 for conducting a secure transaction. System 100 includes a transaction server 102 for facilitating transactions between customers, merchants, financial institutions and payment providers.

Transaction server 102 may be a PCI-DSS compliant server that protects sensitive card data such as the primary account number (PAN) and PIN Block. The server utilises Hardware Security Modules (HSMs) for cryptographic functions including translating (i.e. re-encrypting) PIN blocks, checking the integrity of device requests, appending Message Authentication Codes (MAC) to allow the devices to check the integrity of server messages and responses, and encrypting/decrypting sensitive card holder data.

Transaction server 102 may be front-ended with multiple firewall layers and security access control rules. The perimeter firewall is typically a Web Application Firewall (WAF) that can also detect distributed denial-of-service attacks.

Communication to transaction server 102 is preferably fully encrypted using TLSv1.2 or higher and typically uses web sockets but may use HTTPS RESTful messages.

The main purposes of transaction server 102 are 3-fold; 1) monitoring merchant devices during card presentment and monitoring customer devices during PIN entry; 2) attesting to the integrity of the merchant and customer devices; and 3) processing financial transactions with Acquirers (e.g. Banks) and/or schemes (e.g. VISA, Mastercard or American Express).

Transaction server 102 may be back-ended with micro services or servers for forwarding requests and receiving responses to/from the financial network in secure encrypted constructs as mandated/required by the separate financial payment processing entities.

Transaction server 102 may be hosted by a payment transaction acquirer such as a bank (which may also be the account issuer) or may be hosted by a third party such as a payment switch provider, or payment gateway provider. Transaction server 102 may be implemented as a distributed resource of individual computer processors such as an on-premise or a cloud computing resource, or may be implemented on a single on-premise or cloud hardware device.

System 100 also includes a merchant terminal 104, which is hosted and operated by a merchant such as a business conducting transactions with customers. In some embodiments, merchant terminal 104 is in the form of a mobile device such as a smartphone or tablet computer having an associated processor, display and internal card reader device. Merchant terminal 104 in the form of a mobile device may also include other connected devices such as an external card reader for reading information from a credit card, debit card or other mobile device via Near Field Communication (NFC) protocols. Merchant terminal 104 in the form of a mobile device communicates wirelessly with the internet via a cellular network such as 3G, 4G or 5G or via WIFI to communicate data to and from transaction server 102.

In other embodiments, merchant terminal 104 is in the form of an Electronic Funds Transfer at Point Of Sale (EFTPOS) terminal that is electrically or wirelessly connected to an internet access point and, in turn, in communication with transaction server 102 via the internet. The EFTPOS terminal may include other associated devices such as a card reader device (e.g. swipe, contact or contactless) for reading information from a credit card or mobile device and one or more display devices for displaying information about a transaction to the merchant or customer. These devices may be separate to but in communication with the EFTPOS terminal. Thus, merchant terminal 104 may comprise a single device or a plurality of devices working in conjunction with each other.

System 100 also includes a customer device 106, which typically takes the form of a mobile device such as a smartphone or tablet computer. However, customer device 106 may also include other devices such as wearable devices (e.g. smartwatches) and digital media players.

Figure 2:
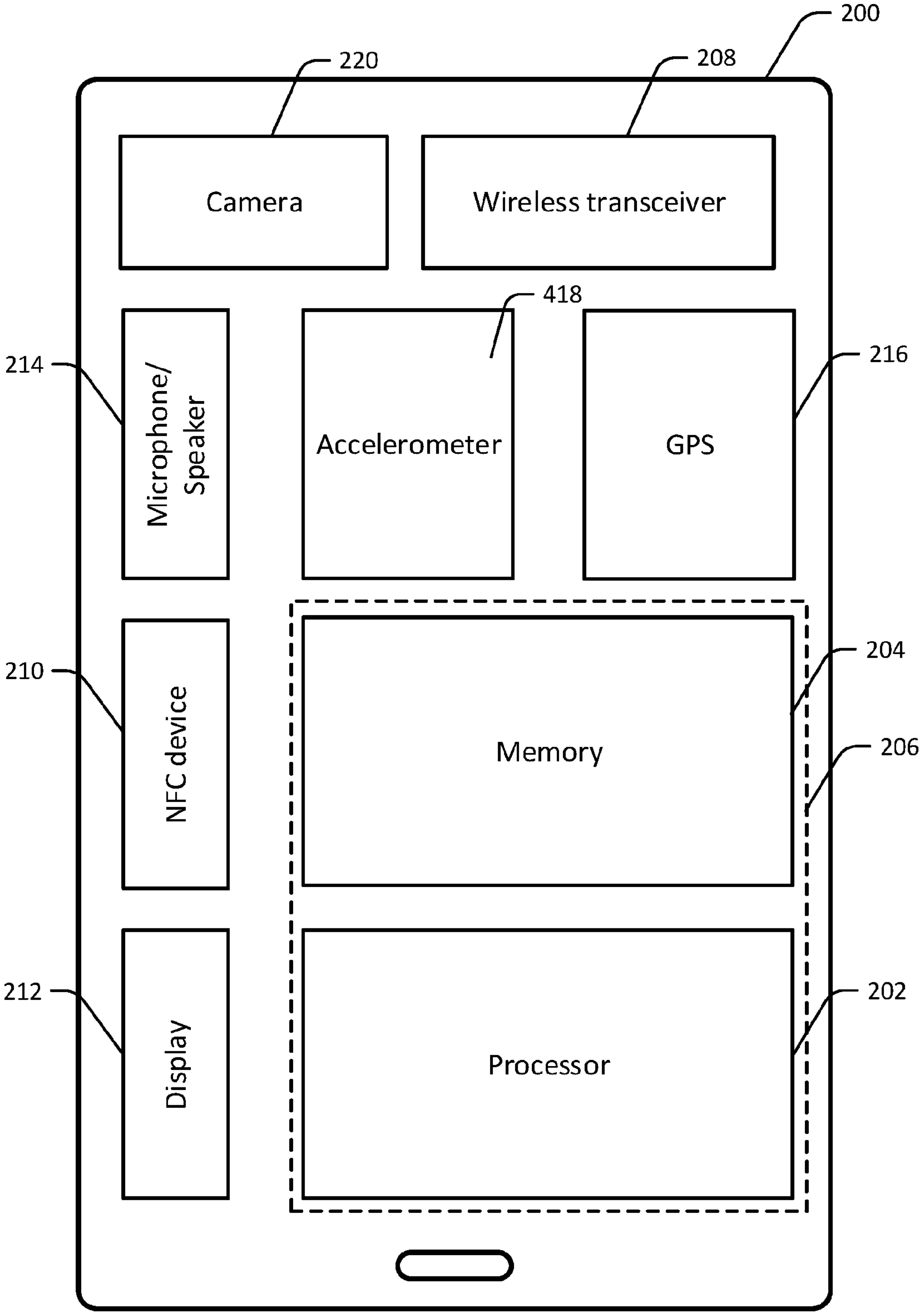
FIG. 2 is a schematic system diagram of a smartphone, illustrating the primary functional components thereof.

Referring now to FIG. 2, there is illustrated schematically a conventional smartphone 200 that can be used as customer device 106 or as merchant terminal 104. Smartphone 200 includes a processor 202 for processing data stored in a memory 204. Processor 202 and memory 204 form a central processing unit (CPU) 206 of smartphone 200.

Smartphone 200 also includes a wireless transceiver module 208 for sending and receiving signals wirelessly to allow smartphone 200 to communicate with other devices and systems. Wireless transceiver module 208 may include various conventional devices for communicating wirelessly over a number of different transmission protocols such as a WiFI™ chip, Bluetooth™ chip, 3G, 4G or 5G cellular network antenna. An NFC device 210 is configured to establish a connection between smartphone 200 and other devices via RFID and associated data transmission protocols.

Smartphone 200 further includes a display 212 such as a touchscreen display for displaying information to a user, a microphone/speaker 212 for receiving audio input and for outputting audio information to a user, a GPS device 216 for receiving a GPS location signal and an accelerometer 218 or other inertial measurement unit (IMU) for detection motion of mobile device 200.

Finally, smartphone 200 includes one or more cameras 220 for capturing digital images from smartphone 200. Processor 202 includes hardware and/or software configured to process the images captured from cameras 220 such as decoding QR codes, barcodes and other images. Smartphone 200 may also include one or more illumination devices such as LEDs for illuminating a scene during image capture by cameras 220. Processor 202 acts as a device controller for controlling the various components of smartphone 200, including camera 220, wireless transceiver 208 and display 212.

Method of Conducting a Secure Transaction

Figure 3:
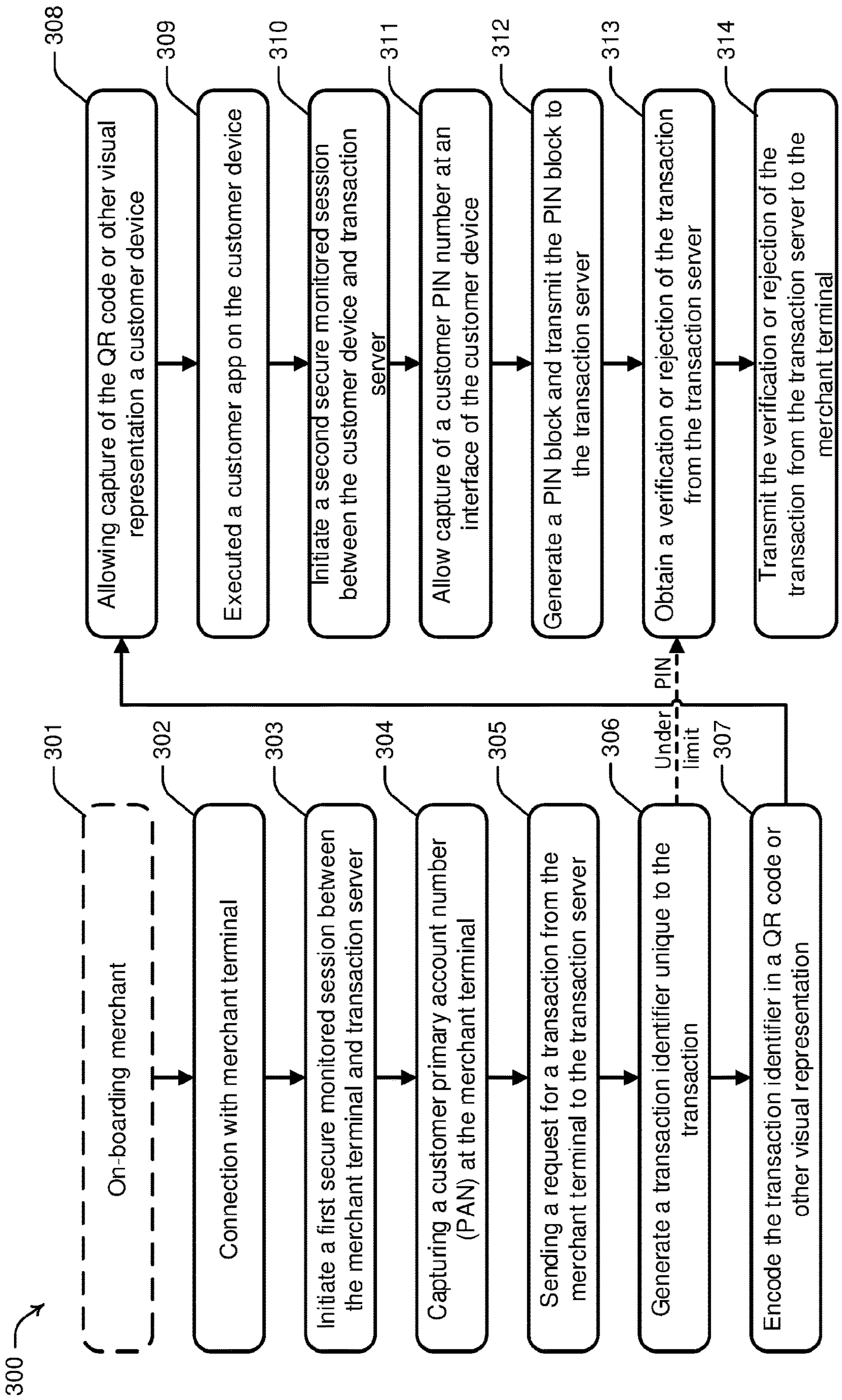
FIG. 3 is a process flow diagram illustrating the primary steps in a method of conducting a secure transaction.

Referring now to FIG. 3, system 100 is capable of facilitating a method 300 of conducting a secure transaction between a merchant and a customer. Method 300 includes an initial onboarding setup step 301, and primary transaction steps 302 to 308. Initial onboarding step 301 is illustrated in dashed lines as it only needs to be performed initially to establish an authorized connection between merchant terminal 104 and transaction server 102. This onboarding process is typically reserved for scenarios where merchant terminal 104 is a mobile device as conventional EFTPOS terminals follow conventional best practice onboarding techniques. Steps 302 to 308 represent steps that are performed for each individual transaction.

Figure 4:
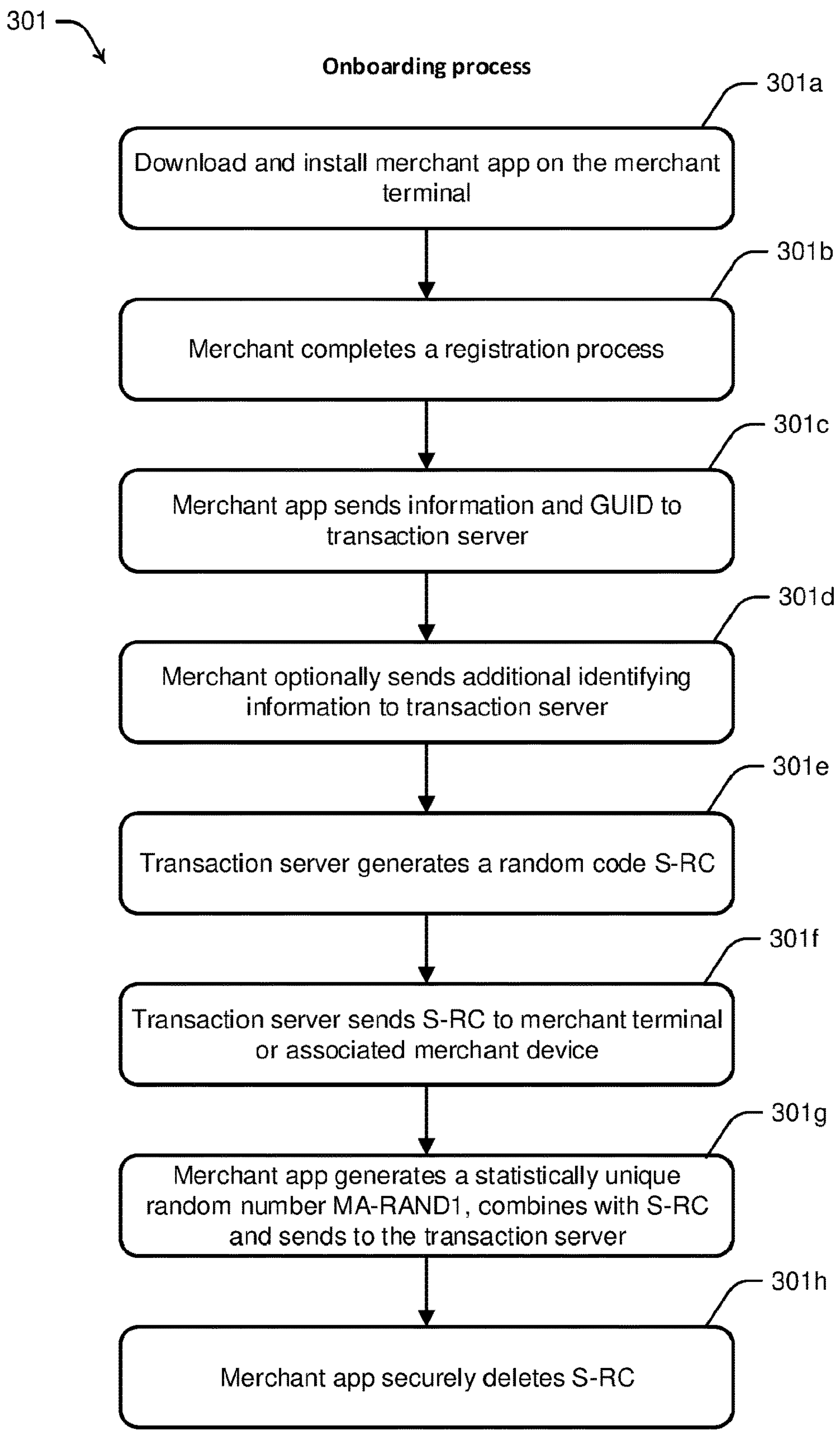
FIG. 4 is a process flow diagram illustrating exemplary sub-steps in onboarding a merchant.

At initial step 301, an onboarding process is commenced in which the merchant is authorized to conduct transactions via transaction server 102. Step 301 includes a number of sub-steps, as illustrated in FIG. 4. At sub-step 301*a*, the merchant downloads and installs a merchant software application (hereinafter "merchant app") on the merchant terminal 104. In the case where merchant terminal 104 is a conventional mobile device such as a smartphone, the merchant app may represent an app downloaded from an app store or database such as the Apple App Store database or Google Play database. In the case where the merchant terminal 104 represents an EFTPOS terminal or the like, the merchant app may be a pre-downloaded application, or an application downloaded to the terminal via the internet from a payment provider or financial institution.

At sub-step 301*b*, the merchant uses the merchant app to complete a registration process by providing enough data to create a merchant trading account. This process may include identifying the merchant, performing a risk assessment of the merchant and contacting a representative of the merchant for obtaining further information. The typical information gathered at this sub-step includes:

- Merchant name.
- Merchant mobile/cell phone number.
- Merchant email address.
- Merchant settlement bank name and branch.
- Merchant settlement banking account number including the branch number.
- List of bank acquirers to create merchant trading accounts with.
- Any additional items as required to identify the merchant for backend Identification purposes.

Performing a risk assessment of the merchant may include performing conventional risk checks such as a Know Your Customer (KYC), Anti Money Laundering (AML) and/or Counter Terrorism Financing (CTF) check.

At sub-step 301*c*, the merchant app sends the information above along with a statistically unique random number such as a Globally Unique Identifier (GUID) to transaction server 102. This statistically unique random number becomes the merchant app identity and is designated as S-ID.

At sub-step 301*d*, the merchant may also be required to activate links to other trusted entities/authorities that will identify the merchant and send a confirmation to the server. The merchant details entered are typically not recorded in the server for privacy purposes. The details are only sent to the entities that the merchant trusts such as government agencies.

At sub-step 301*e*, once the merchant identity and risk level are assessed, and confirmed, transaction server 102 generates a random code (designated "S-RC" herein for reference).

At sub-step 301*f*, transaction server 102 sends S-RC to the merchant terminal 104, or an associated mobile device capable of receiving SMS or email data. S-RC is not sent directly to the merchant app. Preferably, all communication between transaction server 102 and the merchant app use Transport Layer Security TLS v1.2 or higher to encrypt all content and authenticate transaction server 102.

At sub-step 301*g*, the merchant app creates a statistically unique random number (designated "MA-RAND1" for reference). S-ID is concatenated with MA-RAND1. The result is then combined with the random code from the server (S-RC) using a reversable function such as bitwise eXclusive-OR (XOR) or symmetric encryption. The merchant app sends the result:

$$(S\text{-}RC'\mathrm{XOR}(S\text{-}ID|MA\text{-}\mathrm{RAND1})),\ \mathrm{or}(eS\text{-}RC'(S\text{-}ID|MA\text{-}\mathrm{RAND1}))$$

to transaction server 102. Note that S-RC' is a variant of S-RC and 'e' represents encrypt. Hence, in this step, the merchant app encrypts a concatenation of S-ID and MA-RAND1 using S-RC'. S-RC' acts as an encryption key. By way of example, one way to generate S-RC' is to XOR S-RC with a fixed seed value known by both transaction server 102 and the merchant app version. Another example is to transform S-RC using a One-Way-Function which includes a seed value combined using some method then hashing or encrypting the result using a KEK (Key Encrypting Key). The choice of variation is determined by transaction server 102 and the merchant app version, and is used to provide an extra level of security and enforce functional key separation in case S-RC is used for other purposes in the future.

At sub-step 301*h*, the merchant app securely deletes S-RC. The merchant app only stores MA-RAND1 securely. Upon completion of sub-steps 301*a*-301*h*, the merchant is onboarded and authorized to conduct transactions with merchant terminal 104.

With the merchant onboarded, secure transactions can now be carried out between the merchant and customers. Returning to FIG. 3, at step 302, a connection between merchant terminal 104 and transaction server 102 is made upon detection of a transaction. This connection may be triggered by the commencement of a check-out process by the merchant at merchant terminal 104 or an associated check-out device. This may, for example, activate the NFC device within merchant terminal 104. If the transaction is initiated by the merchant using solely the merchant app, then the transaction request is triggered once the merchant selects the transaction type (e.g. Sale or Refund) and enters the total and optional amounts. Only once the transaction request is authenticated and acknowledged by the merchant app will the NFC device be activated to allow subsequent reading of the customer's card (see below).

The merchant app residing on merchant terminal 104 may run in three different modes: Standalone, App-Integrated or Server-Integrated modes. The three modes are not mutually exclusive so that the merchant app can operate in more than one mode at the same time by queuing requests as needed.

In Standalone mode, the merchant selects the financial transaction type, such as purchase (sale), cash-out, refund, authorization, void or completion. The merchant then enters the requested amounts, which may include an optional cashback component and an optional tip amount.

In App-Integrated mode, a third-party merchant software application residing on the same merchant terminal 104 collects the transaction type, the transaction amount(s), and other transaction data such as basket data (items sold: item price, item quantity, and item discount, etc.). The transaction details are then passed to the merchant app as a transaction request via an App-To-App interface such as "Intents" in an Android based platform. In some cases, the third-party merchant software application obtains the transaction type and transaction amount(s) from a PC physically connected to merchant terminal 104 via a USB, Bluetooth, or ethernet cables.

In Server-Integrated mode: The server obtains the transaction details from an external Point Of Sale system running on a PC, Web Portal or external tablet App, etc. The server relays the transaction request to the Merchant App running on the Merchant COTS device.

At step 303, upon detection of a transaction, a first secure monitored session is initiated between merchant terminal 104 and transaction server 102. This first secure monitored session provides a safe window in which merchant terminal 104 can read and encrypt sensitive card holder data such as the PAN. A secure monitored session refers to a mutually authenticated (e.g. TLS 1.3) connection established with the transaction server 102 where the application level data is further encrypted by an established white box cryptography process (described below) using AES-256. During this session, the device (in this case the merchant terminal 104) is periodically attesting by looking for root access as well as utilising runtime-application-security-protection. In some embodiments, the key used to secure the transaction data is refreshed in time periods of 1-5 seconds.

During the first secure monitored session, the merchant app preferably executes a check routine to check for signs of tampering by examining the integrity of the operating system, memory and/or stored code and files of the merchant terminal. This check routine may include executing a checksum or hash value over one or more blocks of data during the session. The operating system may be checked to determine if the merchant terminal 104 is rooted (to allow superuser or administrator level access), jailbroken or has unapproved apps stored thereon. The checks may also determine if the appropriate version or update of the operating system is installed and/or if the processor is being overclocked or underclocked.

The process of monitoring, including performing the check routines is preferably performed regularly at intervals of 2 seconds. In some embodiments, the merchant app reports data from the check routine at least once per second to the transaction server and the transaction server compares the reported data to expected results of the merchant app and the device type it is executing on. The frequency and duration of these checks need to be sufficiently fast to ensure that tampering/hacking events can be captured before sensitive data can be revealed. However, the frequency of this process is limited by data transfers costs, app performance and load on the server. Preferably, the merchant app executes within a trusted execution environment of merchant terminal 104 where possible and available.

In some embodiments, the first secure monitored session expires after a predefined duration such as 30 seconds, 45 seconds or 1 minute. The duration of the first secure monitored session may be configurable but should be sufficient to allow the customer time to present their credit/debit card or digital wallet at merchant terminal 104. After the duration has expired, the session is shut down and the transaction needs to be re-initiated for security purposes.

Figure 5:
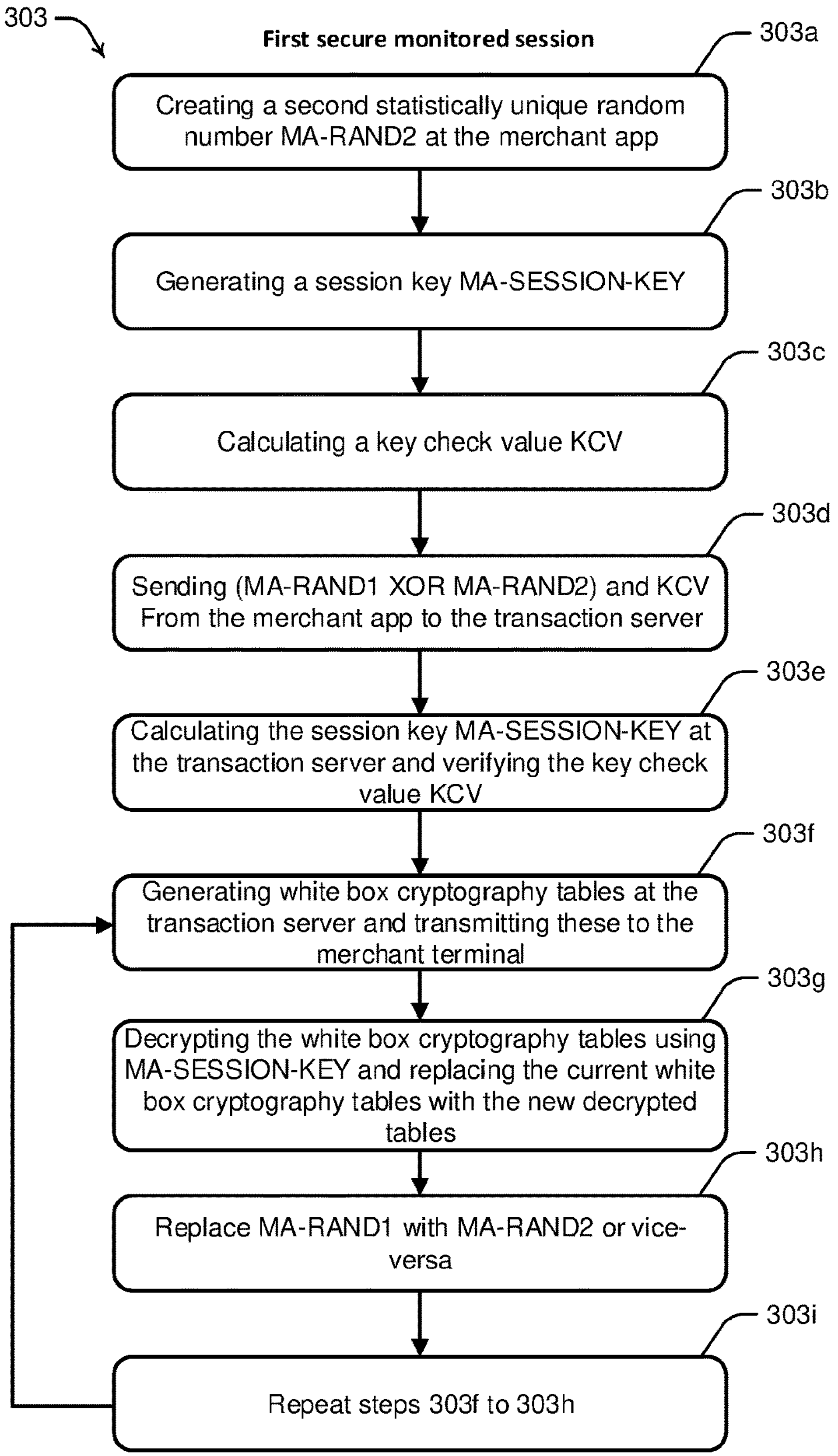
FIG. 5 is a process flow diagram illustrating exemplary sub-steps in initiating a secure monitored session between the merchant terminal and transaction server.

Exemplary sub-steps of initiating this first secure monitored session between the merchant terminal 104 and transaction server 106 are described below with reference to FIG. 5.

At sub-step 303*a*, the merchant app controls a processor of merchant terminal 104 to create a second statistically unique random number (designated "MA-RAND2" for reference).

At sub-step 303*b*, a session key (designated "MA-SESSION-KEY" for reference) is generated using MA-RAND2 and a unique seed value as key parameters. This unique seed value may correspond with the merchant app version. In some embodiments, the MA-SESSION-KEY is generated by applying a one way function to both MA-RAND2 and the unique seed value.

At sub-step 303*c*, the merchant app calculates a key check value (designated "KCV" for reference) of MA-SESSION-KEY. The KCV is typically a 6 digit hexadecimal value. It is typically calculated by encrypting a block of zeros by a key. The key in this instance is MA-SESSION-KEY. The first 6 hex digits of the result=KCV.

At sub-step 303*d*, the merchant app sends the function (MA-RAND1 XOR MA-RAND2) and KCV from the merchant app to transaction server 102. Here XOR represents a bitwise eXclusive OR function such that (MA-RAND1 XOR MA-RAND2) represents a first data item sent to transaction server 102 and KCV represents a second data item sent to transaction server 102.

At sub-step 303*e*, transaction server 102 calculates the session key MA-SESSION-KEY and its KCV by extracting it from the function received in step 303*d*. It then verifies its calculated KCV against the KCV received from the merchant app. If the key check value KCV calculated at transaction server 102 mismatches the key check value KCV received from the merchant app, transaction server 102 replaces MA-RAND1 with an alternate statistically unique random number (designated "MA-RAND1-BAK" for reference) if available. If the key check value KCV calculated at transaction server 102 still mismatches with the key check value KCV received from the merchant app, then an error condition is raised and an alert may be issued to the merchant and/or customer. In some embodiments, after a predefined number of error conditions, the merchant app may send a request to transaction server 102 to generate an alternative first statistically random number MA-RAND1.

At sub-step 303*f*, white box cryptography tables are generated and transmitted from transaction server 102 to merchant terminal 104 and processed by the merchant app. White box cryptography tables represent the bytes used to source the white box cryptography session. In some embodiments, an AES-256 key is embedded using some established process by the transaction server and then derived by the merchant application utilising a white-box cryptography process. White box cryptography techniques combine methods of encryption and obfuscation to embed secret keys within application code and cryptography tables. Symmetric encryption methods are based on continuous shifting, rotation and substitution operations based on the data getting encrypted/decrypted. The key and fixed values are stored within the cryptography tables. In white box cryptography, the key is embedded within the cryptography tables. The goal is to combine code and keys in such a way that the two are indistinguishable to an attacker, and the new "white box" program can be safely run in an insecure environment. The size and length of the white box cryptography tables is dependent on the encryption algorithm.

The white box cryptography tables are preferably encrypted using MA-SESSION-KEY. In some embodiments, the white box cryptography tables include an embedded single use key. In one embodiment, the single use key is an AES-256 Symmetric single use key.

If transaction server 102 used MA-RAND1 to calculate MA-SESSION-KEY, then transaction server 102 sets MA-RAND1-BAK=MA-RAND1, then replaces MA-RAND1 with MA-RAND2.

At sub-step 303*g*, the merchant app executes a decryption algorithm to decrypt the white box cryptography tables using MA-SESSION-KEY. The current white box cryptography tables are replaced with the new decrypted tables At sub-step 303*h*, MA-RAND1 is replaced with MA-RAND2 by the merchant app.

At step 303*i*, steps 303*f* to 303*h* are repeated at predefined time intervals during the first secure monitored session. In some embodiments, the white box cryptography tables are replaced at time intervals in the range of 1 to 5 seconds. In one embodiment, the white box cryptography tables are replaced at time intervals of every 2 seconds. The timing of replacing the cryptography tables is preferably shorter than a time that hacking attempts may be able to uncover the S-KSU key. In other embodiments, black box cryptography may be employed instead of white box cryptography in steps 303*f* to 303*h*.

Importantly, the activation of the NFC device of merchant terminal 104 is only performed once the first secure monitored session reaches step 303*i* for the first time. The NFC device is deactivated if the device exits the first secure monitored session due to security violations or communication failures. The NFC device is also deactivated once sensitive card holder data such as the PAN have been captured and communication between the merchant terminal 104 and the card holder's credit/debit card or token is no longer required.

Returning to FIG. 3, at step 304, during the first secure monitored session, a customer primary account number (PAN) is captured at merchant terminal 102. The customer PAN may represent a debit or credit card number, a tokenized version thereof, or an encrypted version thereof that is associated with a customer account at a financial institution such as a bank. This capture of the customer PAN may be performed as part of an NFC contactless payment process by bringing a credit card, debit card or customer device 106 having an associated digital wallet functionality into close proximity with merchant terminal 104. This may trigger an NFC interface to initiate Europay, Mastercard and Visa (EMV) Application Protocol Data Unit (APDU) packet exchanges with the customer's credit/debit card or a digital card wallet running on customer device 106 or another NFC-enabled device. However, this reading process does not attempt to read the customer PAN or its token, and the PAN/Token expiry date unless it has valid white box cryptography tables. Alternatively, where merchant terminal 104 is an EFTPOS terminal, the PAN may be captured by swiping a credit or debit card through an associated card reader.

The EMV packet exchanges result in the merchant app obtaining the following:

A PAN or its Token Number;

The PAN/Token expiry date;

A card or digital wallet cryptogram providing point-to-point encryption with the card/token issuer;

Device, card and variable transaction details and

Offline authentication results.

The merchant app protects the above data items from the time it captures the data until the time it encrypts them using S-KSU. The white box cryptography tables are immediately deleted afterwards.

At step 305, a request for a transaction is transmitted from merchant terminal 104 to transaction server 102. The request includes the customer PAN, or an encrypted version thereof, and a transaction amount for the transaction (e.g. $250).

At step 306, transaction server 102 generates a transaction identifier (designated "TRANS-ID" for reference) that is unique to the transaction being requested. The transaction identifier is preferably a significantly long value so as to be considered statistically unique. By way of example, TRANS-ID may be a 60 digit hexadecimal value. This transaction identifier is sent to merchant terminal 104 for subsequent use by the merchant app. Transaction server 102 may also generate a first timestamp (designated "TIMESTAMP1" for reference) corresponding to a time when the transaction was requested or initiated.

If the transaction amount is less than a predefined threshold amount, such as $100, the transaction may proceed without the need for the customer to enter a PIN. In this case where no PIN is required, the transaction traverses from transaction server 102 through the financial network to the issuer for a financial result (approval or denial).

At step 307, the transaction identifier is encoded in a visual representation such as a QR code, bar code or other digital image having a one, two or three dimensional distribution of data points. The first timestamp may also be encoded into the QR code or visual representation. In some embodiments, the transaction identifier is encoded into a sequence of visual data points that changes over a series of image frames. The encoded visual representation is presented on a display of merchant terminal 104 that is visible to the customer. Where merchant terminal 104 is a mobile device, this display may be the display of that mobile device. The encoded visual representation is presented to the user by processor 202 controlling display 212 to visually display the representation on display 212 in the conventional manner of displaying a QR code or other images.

At step 308, visual representation presented on the display may be captured by camera 220 on customer device 106. This may be performed by opening a primary software application dedicated to controlling camera 220 or a third party app that has permission to control camera 220.

The QR code or other visual representation includes encoded information that, when processed by processor 202 of customer device 106, performs one or more functions. In particular, at step 309, in response to the capture of the QR code, a customer app on customer device 106 is executed. If the customer app is already downloaded into customer device 106, scanning the QR code will launch the app in a conventional manner. By "launch" it is intended to mean initiating and executing functions of a software app on the customer device 106. This may include executing algorithms by processor 202, rendering graphics on display 212 and initiating control of other devices such as camera 220. Depending on the permissions of customer device 106, the app may be launched even when inactive on customer device 106. However, if the customer app has not already been downloaded onto customer device 106, in some embodiments, the customer app may be instantly downloaded then executed on the customer device as an 'instant app' or 'app clip'. These are small versions of a larger app that are able to be executed on a mobile device without the full app being installed on the device. The instant app or app clip will typically include a subset of the full app features. In the present invention, the customer app (described below) is sufficiently small so that they can be performed in a small size app, an instant app or app clip version of the fully featured customer app. However, in some embodiments, the customer will be prompted or encouraged to download the full app for additional features.

At step 310, the customer app is configured to initiate a second secure monitored session. This session is between the customer device and the transaction server. This second secure monitored session provides a safe window in which a customer's PIN number can be entered. During the second secure monitored session, the customer app preferably executes a check routine similar to that performed in the first monitored session described above. This check routine checks for signs of tampering by examining the integrity of the operating system, memory and/or stored code and files of customer device 106. This check routine may include executing a checksum or hash value over one or more blocks of data during the session. The operating system may be checked to determine if the customer device 106 is rooted (to allow superuser or administrator level access), jailbroken or has unapproved apps stored thereon. The checks may also determine if the appropriate version or update of the operating system is installed and/or if the processor is being overclocked or underclocked. In some embodiments, during the second secure monitored session, the customer app reports data from the check routine at least once per second to the transaction server and the transaction server compares the reported data to expected results of the customer app and the device type it is executing on.

Like with the first secure monitored session, the process of performing the check routines is preferably performed regularly at intervals of 2 seconds. In some embodiments, the customer app reports data from the check routine at least once per second to the transaction server and the transaction server compares the reported data to expected results of the customer app and the device type it is executing on. The frequency and duration of these checks need to be sufficiently fast to ensure that tampering/hacking events can be captured before sensitive data can possibly be revealed. However, their frequency is limited by data transfers costs, app performance and load on customer device 106. Preferably, the customer app executes within a trusted execution environment of customer device 106 where possible and available.

In some embodiments, the second secure monitored session expires after a predefined duration such as 30 seconds, 45 seconds or 1 minute. The duration of the second secure monitored session may be configurable but should be sufficient to allow the customer time to input their PIN at customer device 104. After the duration has expired, the session is shut down and the transaction needs to be re-initiated for security purposes.

Figure 6:
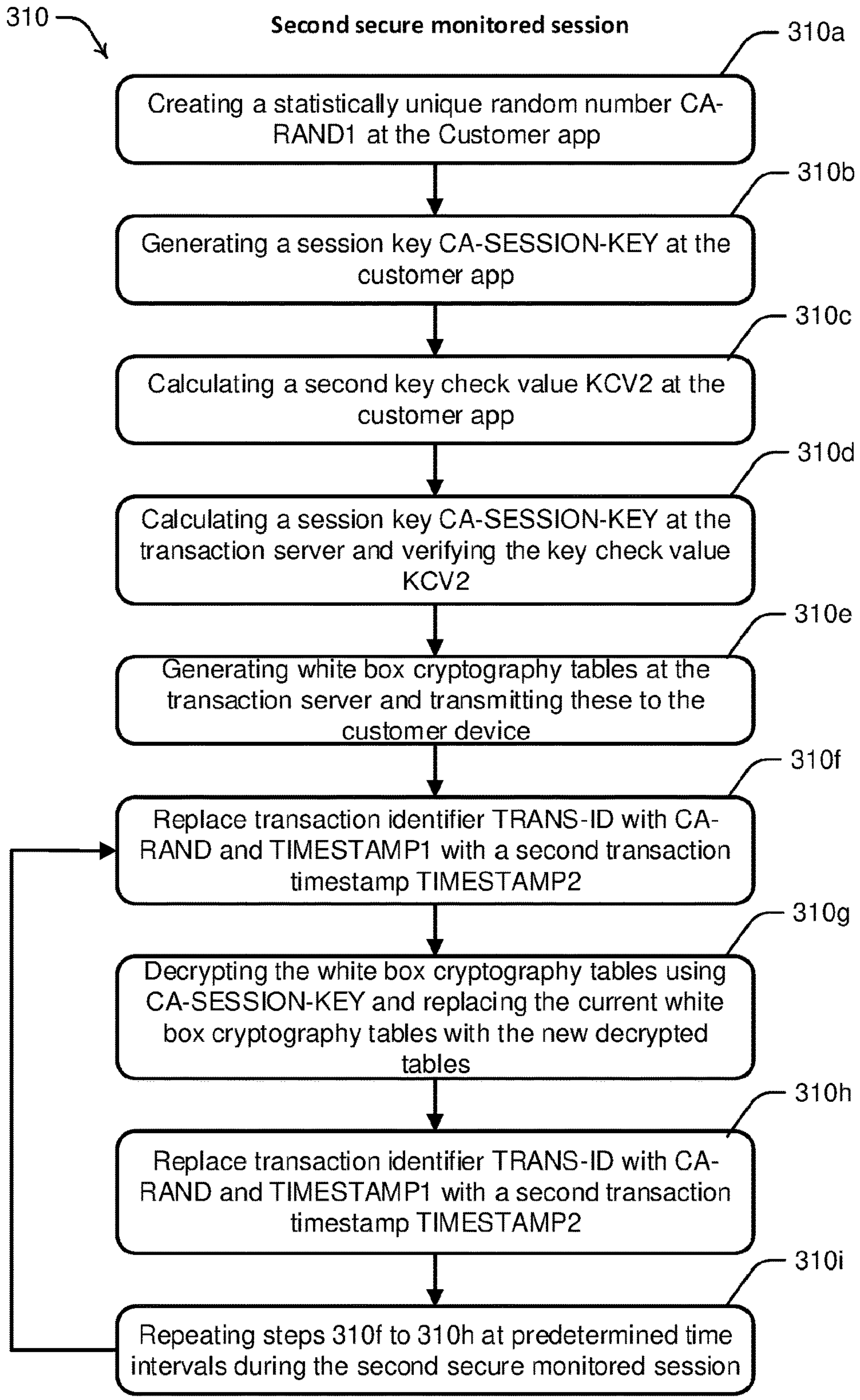
FIG. 6 is a process flow diagram illustrating exemplary sub-steps in initiating a secure monitored session between the customer device and transaction server.

The second secure monitored session is performed in a similar manner to that of the first secure monitored session above. Exemplary sub-steps of initiating the secure monitored session between customer device 106 and transaction server 102 are illustrated in FIG. 6.

At sub-step 310*a*, the customer app controls processor 202 of customer device 106 to generate a statistically unique random number (designated "CA-RAND" for reference). CA-RAND is specified to be of sufficient length so as to be considered statistically random. By way of example, CA-RAND may be a 32 digit hexadecimal value.

At sub-step 310*b*, a session key (designated "CA-SESSION-KEY" for reference) is generated by the customer app using CA-RAND and a second unique seed value as key parameters. This second unique seed value may correspond with a version of the customer app. The CA-SESSION-KEY may be generated by applying a one way function to CA-RAND and the second unique seed value.

At sub-step 310*c*, a second key check value (designated "KCV2" for reference) of CA-SESSION-KEY is calculated at customer device 106.

As part of sub-step 310*c*, the customer app executes a function based on TRANS-ID, TIMESTAMP1 and CA-RAND and sends the result and KCV2 to transaction server 102 such as:

$$(\text{Hash}(\text{func}(\text{TRANS-}ID,\text{TIMESTAMP1}))\text{XOR}\ CA\text{-RAND})$$

Here XOR represents a bitwise eXclusive OR function. The function must be some known (i.e. agreed between transaction server 102 and customer device 106) lossless function involving both TRANS-ID and TIMESTAMP. The result of this function is then hashed to make it the same size as CA RAND and statistically unique for that size. The hash will statistically make a unique combination of TRANS-ID and TIMESTAMP as unique as possible where the result will change dramatically even after a tiny change.

At sub-step 310*d*, the CA-SESSION-KEY is calculated at transaction server 102 and KCV2 is calculated then verified against the KCV2 obtained from the customer app. If KCV2 calculated at transaction server 102 mismatches KCV2 received from the customer app, transaction server 102 replaces TRANS-ID and TIMESTAMP1 with replacement values TRANS-ID-BAK/TIMESTAMP-BAK. If the KCV2 values still mismatch, the financial transaction needs to be reinitiated.

At sub-step 310*e*, white box cryptography tables, a second transaction timestamp (designated "TIMESTAMP2" for reference) indicating a current transaction time and a statistically unique PAN (PAN-RAND) are generated and transmitted from transaction server 102 to the customer app on customer device 106. The white box cryptography tables are preferably encrypted using the CA-SESSION-KEY. In some embodiments, a Single Use AES-256 Symmetric Key (S-KSU2) is embedded within the tables.

At sub-step 310*f*, If transaction server 102 used TRANS-ID to calculate CA-SESSION-KEY, the server sets TRANS-ID-BAK=TRANS-ID, and sets TIMESTAMP-BAK=TIMESTAMP1. TRANS-ID is then replaced with CA-RAND and TIMESTAMP1 is replaced with TIMESTAMP2 at transaction server 102.

At sub-step 310*g*, the customer app executes a decryption algorithm to decrypt the white box cryptography tables using CA-SESSION-KEY. The current white box cryptography tables are replaced with new decrypted tables.

At sub-step 310*h*, the customer app replaces TRANS-ID with CA-RAND ad replaces TIMESTAMP1 with TIMESTAMP2.

At sub-step 310*i*, processing returns to step 310*f*. Steps 310*f* to 310*h* are then repeated at predetermined time intervals during the second secure monitored session. In some embodiments, the white box cryptography tables are replaced at time intervals in the range of 1 to 5 seconds. In one embodiment, the white box cryptography tables are replaced at time intervals of every 2 seconds. The timing of replacing the cryptography tables is preferably shorter than the time that hacking attempts may be able to uncover the S-KSU key.

In some embodiments, the white box cryptography tables are deleted upon ending the second secure monitored sessions.

At step 311, the customer app controls customer device 106 to present the customer with a user interface on display 212 to enter a PIN number associated with the customer account of the customer. This is illustrated schematically as a visual pin pad in FIG. 1. The interface is configured to receive the customer's PIN number.

At step 312, after receiving the customer's PIN number, the customer app generates a PIN block for the PIN number and transmits the white box encrypted PIN block to transaction server 102 for translation. Once translated, it is sent to the card/token issuer for verification. A PIN block is a number or code having the customer's PIN number encrypted therein and which is used to securely transmit a PIN number. PIN blocks come in many different formats. In one format, the PIN block is constructed by XOR-ing two 64-bit fields: the plain text PIN number field and PAN-RAND, both of which comprise 16 four-bit nibbles (a four bit aggregation of data). The plain text PIN field is defined by:

- one nibble with the value of 0, which identifies this as a format 0 block;
- one nibble encoding the length N of the PIN;
- N nibbles, each encoding one PIN digit; and
- 14-N nibbles, each holding the "fill" value 15 (i.e. 11112)

The account number field may be defined by:

- four nibbles with the value of zero; and
- 12 nibbles containing the right-most 12 digits of the primary account number (PAN-RAND), excluding the check digit.

At step 313, the transaction server obtains a verification or rejection of the transaction from the financial institution associated with the customer account. During this verification process, transaction server 102 translates the PIN block from encryption under S-KSU2 to an encryption under the acquirer or scheme PIN encryption key for that transaction sequence. In the process, PAN-RAND is replaced with the actual PAN obtained from merchant device 104. The acquirer or scheme forwards the encrypted PIN block to the issuer by translating it from encryption under their PIN encryption key to the issuer PIN encryption key. The issuer has the PIN and can verify the entered PIN value. There may be multiple hops in the financial transaction flow. If so, multiple translations occur. If the acquirer is the card/token issuer, no further translations occur and the acquirer/issuer can verify the PIN.

Finally, at step 314, the verification or rejection of the transaction is transmitted from transaction server 102 to merchant terminal 104 to complete the transaction. The verification may also be transmitted to customer device 106 by way of a visual alert on display 121 and/or an audible alert via speaker 214.

In some embodiments, even if the transaction does not require a PIN entry, the merchant terminal 104 may still display a QR Code that the customer may optionally scan to download the full customer app and obtain an electronic receipt for the transaction. The customer app can then be used to view past transactions for the customer and transaction server 102 or another third party device is able to provide customer with loyalty rewards. The customer can also be notified through the app of future transactions using the same credit/debit card.

It will be appreciated that the above described system and method allow for a secure transaction to occur in which the customer mobile device is the PIN capture device. Importantly, this allows the PIN entry device to be separated from the merchant terminal device that reads the customer's card or digital wallet. This physical separation of card reading and PIN entry devices provides for additional security in conducting a transaction. In some embodiments, the customer mobile device may be used to enter the PIN without having any prior registration of the mobile device or the account. A customer mobile device can be authorized at the POS to use the mobile device for PIN entry for a transaction. This allows a transaction requiring a PIN to be conducted without a PIN entry device at the merchant or without entering the PIN at a merchant terminal.

In general, embodiments of the present invention provide an alternate approach relating to Software Based PIN Entry on COTS device (SPOC) to securely capture a customer's PIN on their own device instead of the merchant's device.

Interpretation

Throughout this specification, the terms "statistically unique random number" are used. Statistical uniqueness is achieved when an individual number or identifier can be distinguished from all other numbers/identifiers in a population or sample. Within a defined degree of confidence or error, each statistically unique number can be uniquely identified. As such, a statistically unique random number is a number that can be generated in a random or pseudorandom manner by a random number generator to produce a number that is statistically unique within a larger sample population.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "controller", "server" or "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors grouped locally or distributed across a network such as in a cloud computing environment.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives “first”, “second”, “third”, etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms “coupled” and “connected,” along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. “Coupled” may mean that two or more elements are either in direct physical, electrical or optical contact, or that two or more elements are not in direct contact with each other but yet still co-operate or interact with each other.

Embodiments described herein are intended to cover any adaptations or variations of the present invention. Although the present invention has been described and explained in terms of particular exemplary embodiments, one skilled in the art will realize that additional embodiments can be readily envisioned that are within the scope of the present invention.

What is claimed is:

1. A method of conducting a secure transaction between a merchant and a customer, the method including:

initiating a first secure monitored session between a merchant terminal and a transaction server;

wherein the first secure monitored session refers to a mutually authenticated connection in which sensitive data is encrypted;

during the first secure monitored session, capturing a customer primary account number (PAN) at the merchant terminal, the customer primary account number being associated with a customer account at a financial institution;

wherein the PAN represents a debit or credit card number, a tokenized version thereof, or an encrypted version thereof that is associated with the customer account at the financial institution;

sending a request for a transaction from the merchant terminal to the transaction server, the request including the customer PAN and a transaction amount;

generating, at the transaction server, a transaction identifier (TRANS-ID) that is unique to the transaction and a timestamp (TIMESTAMP1) corresponding to a time when the transaction was requested or initiated, and sending TRANS-ID and TIMESTAMP1 to the merchant terminal;

encoding the TRANS-ID and TIMESTAMP 1 in a visual representation for presentation on a display;

allowing capture of the visual representation by a camera on a customer device;

in response to the capture of the visual representation on the customer device, launching a customer app on the customer device, wherein the customer app:

initiates a second secure monitored session between the customer device and the transaction server, wherein the second secure monitored session refers to a second mutually authenticated connection for providing a safe window in which a PIN number associated with the customer PAN is entered;

controls the customer device to present the customer with a user interface to enter the PIN number associated with the customer PAN;

generates a PIN block for the PIN number using a random primary account number downloaded from the server and transmit the PIN block to the transaction server for verification;

obtaining, at the transaction server, a verification or rejection of the transaction from the financial institution associated with the customer account; and transmitting the verification or rejection of the transaction to the merchant terminal to complete the transaction.

2. The method according to claim 1 wherein the merchant terminal is authorized to communicate with the transaction server via a merchant app that is stored on the merchant terminal using a first unique random number (MA-RAND1) as a temporary merchant identifier in an onboarding process between the merchant terminal and the transaction server.

3. The method according to claim 2 wherein the step of initiating the first secure monitored session includes:

i) creating, at the merchant app, a second unique random number (MA-RAND2);

ii) generating a session key (MA-SESSION-KEY) using MA-RAND2 and a seed value for the merchant app version as key parameters;

iii) calculating a key check value (KCV) of MA-SESSION-KEY;

iv) sending MA-RAND1 XOR MA-RAND2 and KCV from the merchant app to the transaction server, where XOR represents a bitwise exclusive OR function;

v) calculating MA-SESSION-KEY at the transaction server and verifying the KCV against the KCV received from the merchant app;

vi) sending white box cryptography tables from the transaction server to the merchant app, wherein the white box cryptography tables are encrypted using MA-SESSION-KEY, wherein the white box cryptography tables represent bytes used to source a white box cryptography session;

vii) decrypting, at the merchant app, the white box cryptography tables using MA-SESSION-KEY and replacing the white box cryptography tables with the new decrypted tables;

viii) replacing MA-RAND1 with MA-RAND2; and ix) repeating steps vi) to viii) at predefined time intervals during the first secure monitored session.

4. The method according to claim 3 wherein the MA-SESSION-KEY is generated by applying a one way function to both MA-RAND2 and the seed value.

5. The method according to claim 3 wherein, when KCV calculated at the transaction server mismatches KCV received from the merchant app, the transaction server replaces MA-RAND 1 with an alternate unique random number (MA-RAND 1-BAK).

6. The method according to claim 5 wherein, when the KCV calculated at the transaction server mismatches with the KCV received from the merchant app, then an error condition is raised.

7. The method according to claim 6 wherein, after a predefined number of error conditions, the merchant app requests that the server generates an alternative first random number MA-RAND1.

8. The method according to claim 3 wherein the white box cryptography tables include an embedded single use key.

9. The method according to claim 8 wherein the single use key is an AES-256 Symmetric single use key.

10. The method according to claim 3 wherein the white box cryptography tables are replaced at time intervals in the range of 1 to 5 seconds.

11. The method according to claim 10 wherein the white box cryptography tables are replaced at time intervals of every 2 seconds.

12. The method according to claim 2 wherein, during the first secure monitored session, the merchant app executes a check routine to check for signs of tampering by examining the integrity of the operating system, memory and/or stored code and files of the merchant terminal.

13. The method according to claim 12 wherein the merchant app executes within a Trusted Execution Environment of the merchant terminal.

14. The method according to claim 12 wherein, during the first secure monitored session, the merchant app reports data from the check routine at least once per second to the transaction server and the transaction server compares the reported data to expected results of the merchant app and the device type executed.

15. The method according to claim 1 wherein the visual representation includes a QR code.

16. The method according to claim 1 wherein, the visual representation includes a barcode.

17. The method according to claim 1 wherein, the merchant terminal is a user mobile device.

18. The method according to claim 17 wherein the user mobile device is a smartphone or tablet computer.

19. The method according to claim 1 wherein the step of initiating a second secure monitored session between the customer device and the transaction server includes:

a) creating a unique random number (CA-RAND) at the customer app;

b) generating a session key (CA-SESSION-KEY) using CA-RAND and a second seed value for the customer app version as key parameters;

c) calculating a second key check value (KCV2) of CA-SESSION-KEY at the customer app and sending KCV2 and a hash of a function result combining TRANS-ID and TIMESTAMP1 XOR CA-RAND to the transaction server;

d) calculating the CA-SESSION-KEY at the transaction server and verifying KCV2 against the KCV2 obtained from the customer app;

e) sending white box cryptography tables, a second transaction timestamp (TIMESTAMP2) and a random PAN from the transaction server to the customer app, wherein the white box cryptography tables are encrypted using the CA-SESSION-KEY, wherein the white box cryptography tables represent bytes used to source a white box cryptography session;

f) replacing TRANS-ID with CA-RAND and TIMESTAMP1 with TIMESTAMP2 at the transaction server;

g) decrypting, at the customer app, the white box cryptography tables using CA-SESSION-KEY and replacing the current white box cryptography tables with the new decrypted tables;

h) replacing TRANS-ID with CA-RAND and TIMESTAMP1 with TIMESTAMP2 at the customer app;

i) repeating steps f) to h) at predetermined time intervals during the second secure monitored session.

20. The method according to claim 19 wherein, the CA-SESSION-KEY is calculated at the transaction server by extracting CA-RAND from a hash of a function result combining TRANS-ID and TIMESTAMP1 XOR CA-RAND.

21. The method according to claim 19 wherein, the CA-SESSION-KEY is generated by applying a one way function to CA-RAND and the second seed value.

22. The method according to claim 19 wherein, when KCV2 calculated at the transaction server mismatches the KCV2 received from the customer app, the transaction server replaces TRANS-ID and TIMESTAMP1 with replacement values.

23. The method according to claim 19 wherein, the white box cryptography tables are replaced at time intervals in the range of 1 to 5 seconds.

24. The method according to claim 23 wherein, the white box cryptography tables are replaced at time intervals of every 2 seconds.

25. The method according to claim 19 wherein, the white box cryptography tables are deleted upon ending the first and/or second secure monitored sessions.

26. The method according to claim 19 wherein, during the second secure monitored session, the customer app executes a check routine to check for signs of tampering by examining the integrity of the operating system, memory and/or stored code and files of the customer device.

27. The method according to claim 26 wherein the customer app executes within a Trusted Execution Environment of the customer device.

28. The method according to claim 26 wherein, during the second secure monitored session, the customer app reports data from the check routine at least once per second to the transaction server and the transaction server compares the reported data to expected results of the customer app and the device type it is executing on.

29. A computer system configured to perform a method according to claim 1.

30. A non-transitory carrier medium having instructions stored thereon such that, when executed on a computer, the computer is configured to perform a method according to claim 1.

31. A computer server configured to facilitate a method of conducting a secure transaction between a customer mobile device and a merchant terminal, wherein the server comprises:

a non-transitory medium having instructions stored thereon, wherein the instructions cause the computer server to perform the following method:

conducting a first secure monitored session with the merchant terminal, wherein during the first secure monitored session, a customer primary account number (PAN) is captured at the merchant terminal, the customer PAN being associated with a customer account at a financial institution;

wherein the first secure monitored session refers to a mutually authenticated connection in which sensitive data is encrypted;

wherein the PAN represents a debit or credit card number, a tokenized version thereof, or an encrypted version thereof that is associated with the customer account at the financial institution;

receiving a request for a transaction from the merchant terminal, the request including the customer PAN and a transaction amount;

generating a transaction identifier (TRANS-ID) that is unique to the transaction and a timestamp (TIMESTAMP1) corresponding to a time when the transaction was requested or initiated, and sending TRANS-ID and TIMESTAMP1 to the merchant terminal, wherein TRANS-ID and TIMESTAMP1 are encoded in a visual representation and presented on a display for capture by a camera on the customer device;

conducting a second secure monitored session with the customer device, wherein the second secure monitored session refers to a second mutually authenticated connection which provides a safe window in which a PIN number associated with the customer PAN is entered, wherein during the second secure monitored session, the customer device is controlled to:

present the customer with a user interface to enter the PIN number associated with the customer PAN; and generate a PIN block for the PIN number using a random primary account number downloaded from the server and transmit the PIN block to the server for verification;

receiving the PIN block and obtaining a verification or rejection of the transaction from a financial institution associated with the customer account; and transmitting the verification or rejection of the transaction to the merchant terminal to complete the transaction.

* * * * *